(12) United States Patent
Hickmann et al.

(10) Patent No.: US 9,152,382 B2
(45) Date of Patent: Oct. 6, 2015

(54) REDUCING POWER CONSUMPTION IN A FUSED MULTIPLY-ADD (FMA) UNIT RESPONSIVE TO INPUT DATA VALUES

(71) Applicant: Intel Corporation, Santa Clara, CA (US)

(72) Inventors: Brian J. Hickmann, Sherwood, OR (US); Dennis R. Bradford, Portland, OR (US); Thomas D. Fletcher, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 13/664,689

(22) Filed: Oct. 31, 2012

(65) Prior Publication Data

US 2014/0122554 A1  May 1, 2014

(51) Int. Cl.
  G06F 7/38 (2006.01)
  G06F 7/60 (2006.01)
  G06F 7/48 (2006.01)
  G06F 7/57 (2006.01)
  G06F 7/483 (2006.01)
  G06F 7/544 (2006.01)
  G06F 9/30 (2006.01)
  G06F 1/32 (2006.01)

(52) U.S. Cl.
  CPC G06F 7/60 (2013.01); G06F 1/324 (2013.01); G06F 1/3243 (2013.01); G06F 7/48 (2013.01); G06F 7/483 (2013.01); G06F 7/5443 (2013.01); G06F 7/57 (2013.01); G06F 9/30 (2013.01); G06F 2207/3884 (2013.01); Y02B 60/1217 (2013.01); Y02B 60/1239 (2013.01)

(58) Field of Classification Search
  USPC .......................................................... 708/523
  See application file for complete search history.

(56) References Cited

U.S. PATENT DOCUMENTS

| 5,128,890 | A | * | 7/1992 | Girardeau, Jr. ............... 708/625 |
| 6,427,159 | B1 | | 7/2002 | Giaume |
| 8,037,118 | B2 | | 10/2011 | Quinnell et al. |
| 2004/0230774 | A1 | | 11/2004 | Schwarz et al. |
| 2008/0126756 | A1 | | 5/2008 | Sugimoto |
| 2008/0307029 | A1 | | 12/2008 | Kan |

(Continued)

FOREIGN PATENT DOCUMENTS

| GB | 2 455 401 A | 10/2009 |
| JP | 2008003663 A | 1/2008 |

(Continued)

OTHER PUBLICATIONS

International Search Report mailed Jul. 2, 2012 in international application No. PCT/US2011/061716.

(Continued)

Primary Examiner — Tan V. Mai
(74) Attorney, Agent, or Firm — Trop, Pruner & Hu, P.C.

(57) ABSTRACT

In an embodiment, a fused multiply-add (FMA) circuit is configured to receive a plurality of input data values to perform an FMA instruction on the input data values. The circuit includes a multiplier unit and an adder unit coupled to an output of the multiplier unit, and a control logic to receive the input data values and to reduce switching activity and thus reduce power consumption of one or more components of the circuit based on a value of one or more of the input data values. Other embodiments are described and claimed.

23 Claims, 10 Drawing Sheets

(56) References Cited

U.S. PATENT DOCUMENTS

2009/0106336 A1 4/2009 Muraki
2010/0017635 A1 1/2010 Barowski et al.
2014/0122555 A1 5/2014 Hickmann et al.

FOREIGN PATENT DOCUMENTS

| JP | 2009104405 A | 5/2009 |
| JP | 4482052 | 6/2010 |
| KR | 20010075567 | 8/2001 |
| KR | 20090041339 | 4/2009 |

OTHER PUBLICATIONS

International Application Serial No. PCT/US2011/061716 filed Nov. 21, 2011, entitled "Reducing Power Consumption In A Fused Multiply-Add (FMA) Unit Of A Processor," by Intel Corporation.

Jochen Preiss, et al., "Advanced Clockgating Schemes for Fused-Multiply-Add-Type Floating-Points Units," Aug. 2009, pp. 48 and 50-51.

Korean Patent Office, Office Action Mailed Oct. 28, 2014, in Korean Application No. 2013-0129989.

Japanese Patent Office, Office Action mailed Sep. 16, 2014, in Japanese Application No. 2013-218301.

United Kingdom Patent Office, Office Action mailed Mar. 26, 2014 in United Kingdom Patent Application No. 1318169.8.

Taiwan Patent Office, Taiwanese Office Action mailed Mar. 4, 2015, in Taiwan Patent Application No. 102136982. (Redacted).

U.S. Patent and Trademark Office, Office Action mailed May 20, 2015, with Reply filed on Aug. 12, 2015, in U.S. Appl. No. 13/785,528.

\* cited by examiner

FIG. 9

REDUCING POWER CONSUMPTION IN A FUSED MULTIPLY-ADD (FMA) UNIT RESPONSIVE TO INPUT DATA VALUES

BACKGROUND

One common execution unit in a processor is a fused multiply-add (FMA) unit. In general, a FMA unit can perform an operation on three incoming operands to first multiply two of the operands and then accumulate the product with the third operand. More specifically, an FMA arithmetic logic unit (ALU) is designed to compute A*B+C, where A, B and C are arbitrary values. Typically A is called the multiplier input, B is called the multiplicand input, and C is called the addend input. Most current FMA ALU designs power up and operate at the same power level regardless of the data inputs presented to the FMA ALU. This can cause excessive power consumption, particularly as the multiplication unit of the FMA is a high power consumer.

Some processors use such a unit to perform more simple mathematical operations such as additions, subtractions and multiplications by appropriate selection of the third operand or routing of operands and results via selection circuitry. Accordingly, in many processors a FMA unit may form the backbone of the execution units and may be a key circuit in determining the frequency, power and area of the processor.

Previous solutions to reduce an FMA unit's average power typically focus on reducing power for simpler operations overlaid onto the FMA ALU, often by placing these overlaid operations into a separate floating point ALU that is independent from the FMA ALU. This allows the FMA ALU to power down for these simpler operations, reducing power consumption in these cases. However this is expensive in terms of area and leakage power and hence is not an ideal solution. In addition, this solution cannot save power for FMA instruction execution.

DETAILED DESCRIPTION

In various embodiments, power consumption of a FMA circuit can be controlled and reduced based on analysis of one or more of the input data values and/or instruction to be executed in the circuit. For example, for many data inputs, an answer is either trivially known or can be computed in a more power efficient way. As one example, if one or both of the multiplier or multiplicand inputs are zero, then the result of the FMA computation is trivially equal to the addend. Thus to save power, at least portions of the FMA unit can be powered down via clock gating and the addend bypassed directly to the output.

In addition, more complex optimizations are possible. Take the case in which the multiplicand is a direct power of 2 (e.g., $1.0*2^1=2$). In this case, the multiplier unit that computes the product can be gated off using clock gating and a shift operation may be used to compute the product, saving the large amount of power consumed in the multiplier unit of the circuit. As such, optimizations based on the data inputs themselves may be used to control clock gating and bypass paths to realize efficient operation.

In addition, many operations are overlaid on top of the main FMA datapath within an FMA ALU in order to reuse as much of the datapath as possible. These operations can include simple arithmetic operations such as multiplication, addition and subtraction, logical operations such as AND/OR/shift/rotate, a minimum function, a maximum function, integer operations, comparison operations, and conversion operations such as floating point-to-integer conversions, integer-to-floating point conversions, double-to-single precision and single-to-double precision conversions. Embodiments may perform input data driven clock gating for these operations to save additional average power within an FMA unit.

Embodiments may thus implement fine grain clock gating, controlled via associated control and multiplexing logic, to lower average power when these special data inputs and/or instruction types are detected. In this way operations, including a fused multiply add operation, namely an AB+C operation, can be performed more efficiently. In general, an FMA unit includes a multiplier and an adder, and further includes a single rounder. This FMA unit can be of a relatively wide data width to accommodate operands of a wider width such as vector-size values. For example, in one embodiment this FMA unit can receive 64-bit operands and perform FMA operations on them.

While the scope of the present invention is not limited in this regard, in many implementations the FMA unit may perform floating-point multiply accumulate operations and be compliant for operands of a given format, e.g., of a given Institute of Electrical and Electronics Engineers (IEEE) standard such as the IEEE standard 754-2008 (published 2008) for floating point (FP) arithmetic. Furthermore, a given implementation may be used to handle various types of incoming data, including operands that can be of single and double precision floating point format.

In one embodiment, FMA instruction syntax can be defined using three source operands, where the first source operand is updated based on the result of the arithmetic operations of the data elements. As such, the first source operand may also be the destination operand. For example, an instruction format of: opcode, x1, x2, x3 may be present, where the opcode corresponds to one of multiple user-level FMA or other instructions to perform a given arithmetic operation, and x1-x3 correspond to operands to be processed in the operation.

An arithmetic FMA operation performed in an FMA instruction can take one of several forms, e.g.:

$r=(x*y)+z;$ $r=(x*y)-z;$ $r=-(x*y)+z$; or $r=-(x*y)-z$.

In an embodiment, packed FMA instructions can perform eight single-precision FMA operations or four double-precision FMA operations with 256-bit vectors. Scalar FMA instructions may only perform one arithmetic operation on a low order data element, when implemented using vector registers. The content of the rest of the data elements in the lower 128-bits of the destination operand is preserved, while the upper 128 bits of the destination operand may be filled with zero.

In an embodiment, an arithmetic FMA operation of the form, $r=(x*y)+z$, takes two IEEE-754-2008 single (double) precision values and multiplies them to form an intermediate value. This intermediate value is added to a third single (double) precision value and rounded to produce a single (double) precision result. Different rounding modes and precisions may be implemented in different embodiments.

In one embodiment, vector instructions can be executed on various packed data type representations. These data types may include a packed byte, a packed word, and a packed doubleword (dword) and a packed quadword for 128 bits wide operands. As an example, a packed byte format can be 128 bits long and contain sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Understand however that embodiments apply equally to scalar (individual or non-packed) representations.

Generally, a data element is an individual piece of data that is stored in a single register or memory location with other data elements of the same length. In some packed data sequences, the number of data elements stored in a register can be 128 bits divided by the length in bits of an individual data element. Although the data types can be 128 bit long, embodiments of the present invention can also operate with 64 bit wide or other sized operands.

It will be appreciated that packed data formats may be further extended to other register lengths, for example, to 96-bits, 160-bits, 192-bits, 224-bits, 256-bits or more. In addition, various signed and unsigned packed data type representations can be handled in multimedia registers according to one embodiment of the present invention. And scalar data formats of various types also may be handled in registers of a register file in accordance with an embodiment of the present invention.

Figure 1:
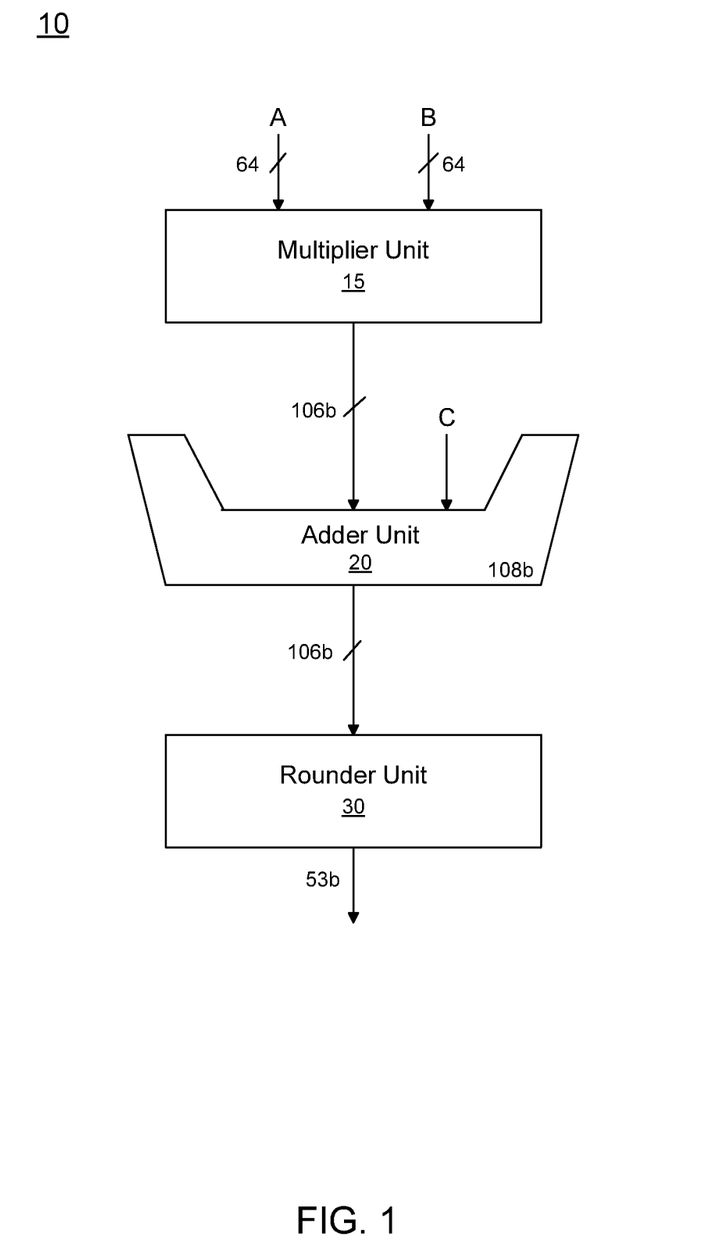
FIG. 1 is a block diagram of a generic fused multiply-add (FMA) unit in accordance with an embodiment of the present invention.

Referring now to FIG. 1, shown is a block diagram of a generic fused multiply-add unit in accordance with an embodiment of the present invention. As shown in FIG. 1, FMA unit 10 includes a multiplier unit 15, an adder unit 20, and a rounder unit 30. In the embodiment shown in FIG. 1, FMA unit 10 can be configured to receive multiple source operands in multiplier unit 15. In the embodiment shown, two source operands, e.g., each of 64 bit widths can be received, although the scope of the present invention is not limited in this regard. For example, in other embodiments, the source operands may be 32 bits or 128 bits.

Accordingly, multiplier unit 15 can generate a product having a width of, e.g., 106 bits, assuming that the inputs for the source operands are 53-bit mantissas of a double precision value. Adder unit 20 is configured to have a width of 108 bits to accommodate this incoming product. In addition, adder unit 20 is further configured to receive an additional source operand, which in some embodiments also can be 64 bits. Adder unit 20 thus generates a sum that can be 106 bytes, which can be provided to a rounder unit 30 that in turn generates a rounded output, e.g., of 53 bits. Of course understand that the datapath may be of different sizes in other embodiments.

To perform a fused multiply add operation on this hardware, two source operands, corresponding to a coefficient A and a variable B, can be provided to multiplier unit 15. In turn, a product of these values can be added with a third source operand (C) in adder unit 20 to thus obtain a sum that can be rounded in rounder unit 30. The result can thus correspond to a value of AB+C. In addition to performing such fused multiply adds, this hardware is further configured to perform multiplications in multiplier unit 15 and further to perform other operations in adder unit 20.

Different types of instructions can be accordingly executed in FMA unit 10. Although the scope of the present invention is not limited in this regard, in one embodiment such instructions can include double precision FMA instructions, single precision FMA instructions, and other double precision and single precision instructions.

Figure 2:
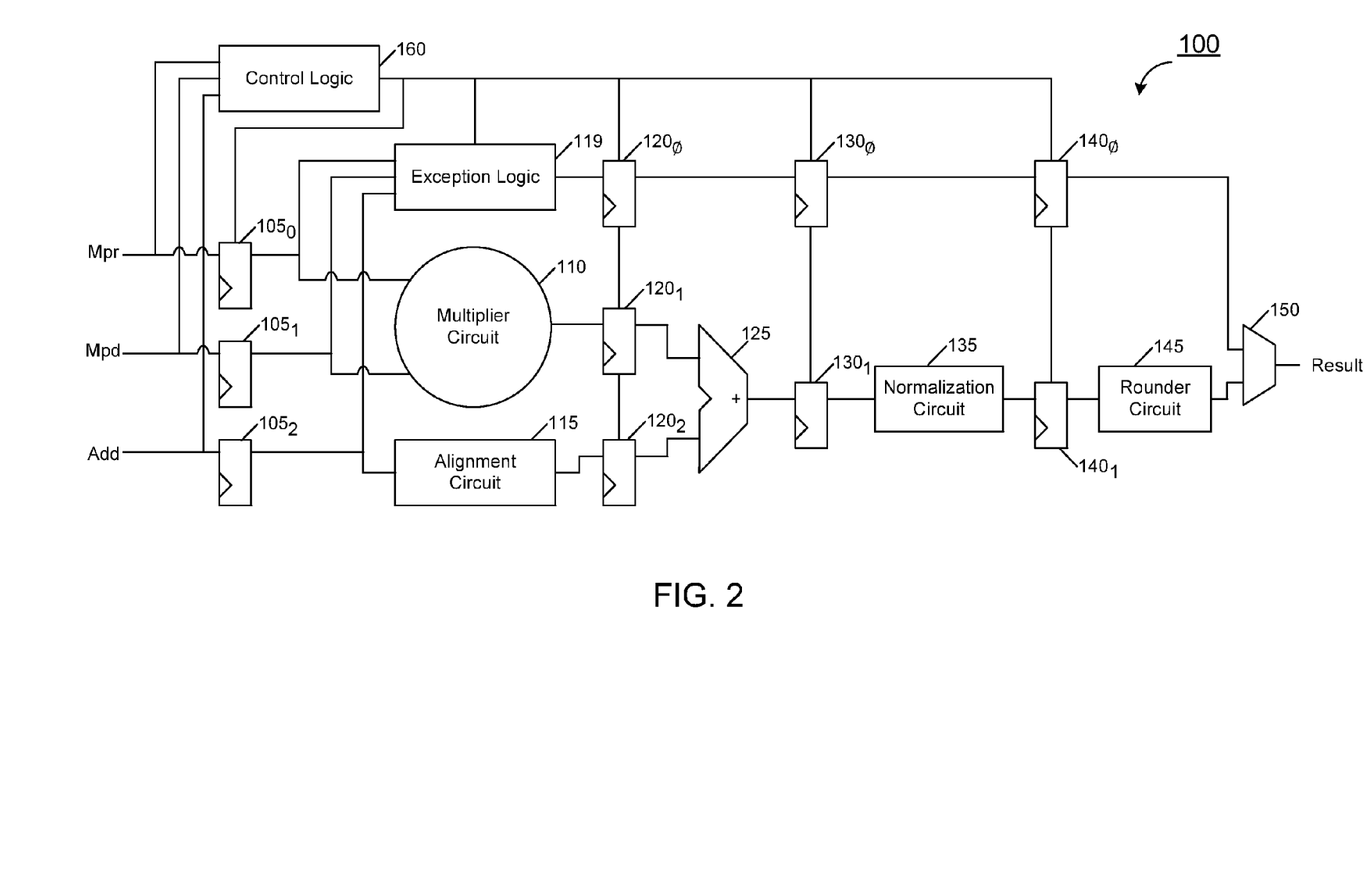
FIG. 2 is a schematic diagram of an FMA circuit in accordance with an embodiment of the present invention.

Referring now to FIG. 2, shown is a schematic diagram of a FMA circuit in accordance with an embodiment of the present invention. As shown in FIG. 2, FMA circuit 100 includes various components to receive input data and perform operations to obtain a desired result. According to various embodiments, based on one or more of the input data values and/or instruction type, control of the circuit can occur in a manner to reduce power consumption by clock gating one or more components of the circuit when not needed for a particular operation. Prior to discussion of specific power conservation techniques available using an embodiment of the present invention, a brief discussion of the general processing pipeline of the FMA circuit 100 is provided.

As seen, each of three incoming input data values is provided to one of a corresponding set of storage elements. More specifically in the embodiment of FIG. 2, a plurality of flops $105_0$-$105_2$ are present. While embodiments described herein use flip-flops such as D-type flip-flops as storage elements, understand the scope of the present invention is not limited in this regard and in other embodiments different types of storage elements such as latches may be used. As seen, an addend input data value is provided to a flop $105_2$, a multiplicand input data value is provided to a flop $105_1$, and a multiplier input data value is provided to a flop $105_0$.

Each of these values is in turn coupled to additional circuitry of the FMA circuit. As seen, the addend is provided to an alignment circuit 115 and also to an exception logic 119. The multiplier and multiplicand values are provided to a multiplier circuit 110 and also to exception logic 119. In an embodiment, alignment circuit 115 may operate to determine an exponent difference between the addend and the product of the multiplicand and multiplier. Multiplier circuit 110 operates to multiply the multiplier and multiplicand values to thus generate a product. In an embodiment, a radix-8 type multiplier may be present, but any type of multiplier could be used (such as other radices or other designs). The product from multiplier circuit 110 is provided to a flop $120_1$ while the aligned addend is provided to a flop $120_2$. In turn, these values may be added in an adder circuit 125. The resulting sum is passed through a flop $130_1$ to a normalization circuit 135, which may perform normalization operations on the sum. This normalized value may couple through a flop $140_1$ to a rounder circuit 145, which may perform rounding to, e.g., according to a given rounding mode identified in a control register or responsive to a rounding mode identified in an instruction being executed. As such, a rounded value is provided to a selector 150, where the value can be output as the result, assuming no exception is indicated via an exception input into selector 150.

In addition to this main datapath, an exception datapath is present. As mentioned above, exception logic 119 receives the input data values. Based on these data values and other information such as various configuration information and so forth, exception logic 119 may generate an exception, e.g., due to an exceptional input or another exception condition. Such an exception indication may then pass through a series of flops 120$_0$, 130$_0$ and 140$_0$ before being provided to selector 150.

Thus as seen in FIG. 2, there are two main datapaths: one for the main FMA computation and one for exceptional cases, e.g., as defined by the IEEE-754-2008 floating point standard. In some embodiments, this bypass path can be used to reduce the cost of implementing a data-based clock gating scheme. The above discussion thus describes the basic operation of the datapath from the input of the FMA circuit to its output.

In addition to two paths, FMA circuit 100 includes a control logic 160 that receives the incoming data values. Logic 160 may further receive an indication of the type of operation to be performed in FMA circuit 100 responsive to a given instruction. Based on this information, control logic 160 may determine that one or more components of the main datapath (and/or the exception datapath) may not be needed for correct operation of a given instruction, e.g., due to the instruction type or the state of the data. As such, control logic 160 may provide control signals to one or more components to power them down. Although the scope of the present invention is not limited in this regard, in an embodiment control logic 160 may gate clock signals to one or more flops throughout the datapath(s) to thus cause these flops to be inactive. In this way, power consumption is reduced as these flops are not active. In addition, without an active flop, there is not toggling of data at an output thereof and as such, downstream circuitry from this flop also does not toggle (and sequential clocks of such circuits may not toggle), further reducing power consumption. Although shown at this high level in the embodiment of FIG. 2, understand the scope of the present invention is not limited in this regard. For example, understand that additional structures may be present in a FMA circuit to handle switching, bypassing, multiplexing and other selecting of appropriate values for input to different points of the datapath. Note also with regard to FMA circuit 100 that the datapath of the circuit is a multi-stage or cycle datapath such that a plurality of processor clock cycles occurs for inputs to be processed throughout the datapath to obtain a final result. In the specific embodiment shown in FIG. 2, a 4-stage or cycle circuit is shown; however the scope of the present invention is not limited in this regard.

In the case where one or both of the multiplier or multiplicand are equal to zero, the product of the multiplier and multiplicand will be zero and the final result can be obtained by gating the entire FMA circuit and passing the addend directly to the output. In the example of one or both of multiplier and multiplicand input data values being equal to zero, virtually all of the main datapath can be gated off and the addend passed directly to the output. In the case where control logic 160 detects that one or more of the multiplier and multiplicand data values are zero, which can be determined in a first cycle in which these values are also provided to flops 105$_0$-105$_2$, the following clock gating may occur. Specifically during a second clock cycle of the instruction, flops 105$_0$ and 105$_1$ can be gated with flop 105$_2$ being clocked to allow the addend to pass through alignment circuit 115, which toggles. Note that because flops 105$_0$ and 105$_1$ are clock gated, multiplier circuit 110 does not toggle. In following clock cycles, flops 120$_1$ and 120$_2$ can be clock gated and in further clock cycles flops 130$_1$ and 140$_1$ also can be clock gated such that adder 125, normalization circuit 135, and rounder circuit 145 do not toggle, further providing additional power conservation. To realize the final result, the addend can be provided directly to selector 150. This provision of the addend value can be via a bypass path from an output of flop 105$_2$ directly to selector 150 (not shown in FIG. 2). Or the value can be passed through the exception datapath, including exception logic 119 and flops 120$_0$, 130$_0$ and 140$_0$, which remain clocked. Thus in an embodiment the addend can be passed through this exception datapath to selector 150.

Another example of power control based on input data values is where an exceptional input is present. When such input is present, e.g., a signaling not a number (sNaN), a quiet not a number (qNaN), infinity, and zero, IEEE 754 standard exception handling rules stipulate the output to be produced. These rules typically specify that either a constant (e.g., $(+\infty * +\infty)$) or a modified version of one of the input values be returned. For example, a sNaN input is modified slightly and returned as the final product. In these exceptional cases, a final result can be determined by analysis of the input values. With reference back to FIG. 2, flops 120$_1$ and 120$_2$ and all downstream flops of the main datapath can be clock gated in these exceptional input cases to thus reduce power consumption. This power consumption is realized both due to the clock gating of these flops as well as the lack of input toggling in the main datapath circuitry including adder 125, normalization circuit 135 and rounder circuit 145. The result can be obtained via the exception datapath, which remains clocked. If the FMA inputs do not hit an exception case, gating can be done in the inverse case as well, and a bypass path can be gated off to save a small amount of power.

Figure 2A:
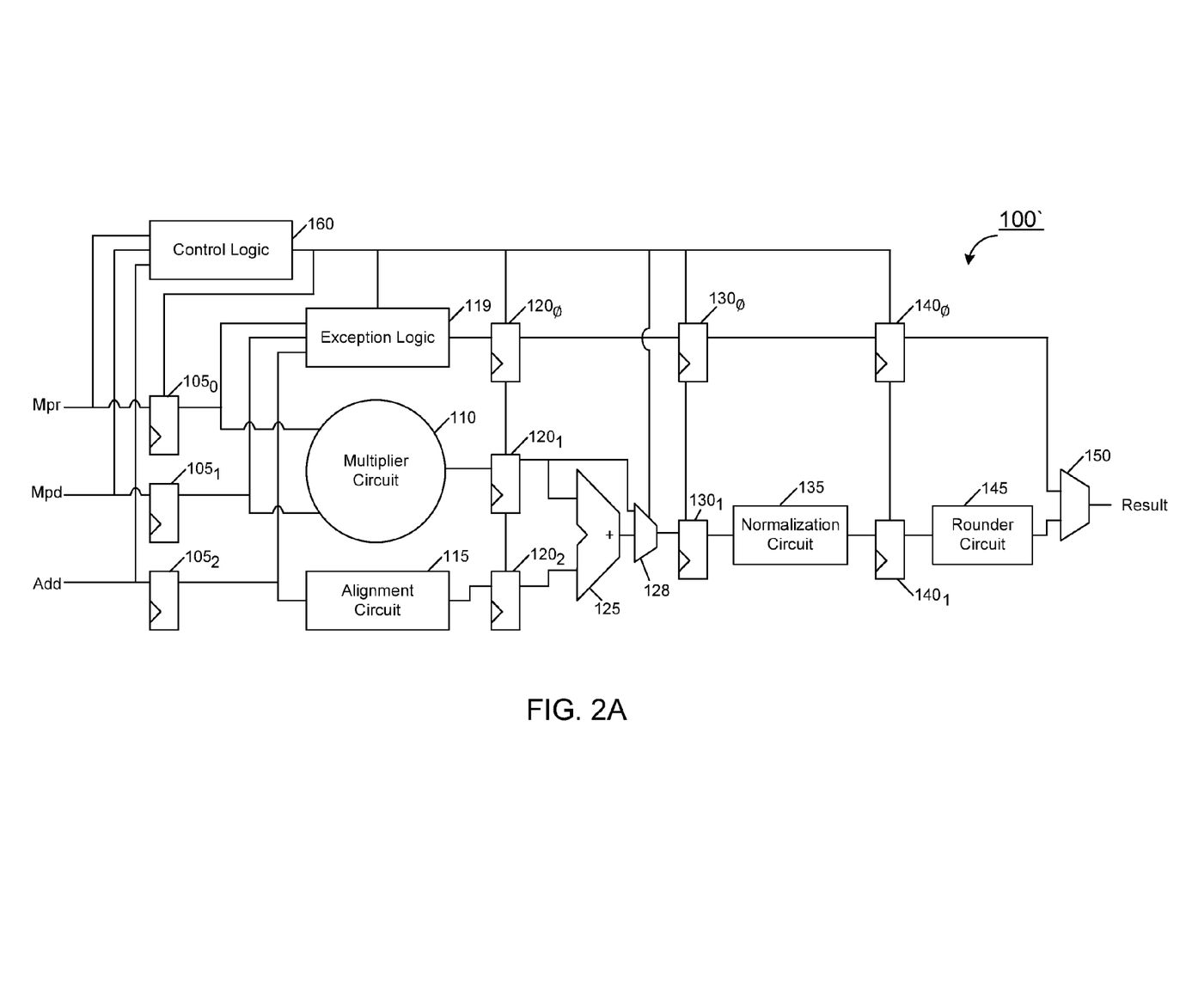
FIG. 2A is a schematic diagram of an FMA circuit in accordance with another embodiment of the present invention.

In the case where the addend is equal to zero, the addend input can be disabled and the adder is bypassed, as the final result will be equal to the product only. While a circuit such as that of FIG. 2 can perform this control, in some embodiments a different FMA arrangement may be present. Referring now to FIG. 2A, shown is a schematic diagram of an FMA circuit in accordance with yet another embodiment of the present invention. As shown in FIG. 2A, FMA circuit 100' may be configured similarly to that of FMA circuit 100. However, note the presence of a selector 128 coupled downstream of adder 125 and flop 120$_1$. When the addend is zero, flop 105$_2$ may be clock gated, thus allowing alignment circuit 115 to not toggle. In addition, flop 120$_2$ may similarly be clock gated. Instead, a product from multiplier circuit 110 may couple directly from flop 120$_1$ to selector 128 to enable passing of this product only through the remainder of the main datapath to be output as the result. In other respects, FMA circuit 100' may be configured similarly to that of circuit 100 of FIG. 2.

Yet another case is where either the multiplier or multiplicand is exactly a power of 2 ($1.0 * 2^N$, where N is an integer, referred to herein as a power of two) and hence the multiplier that computes the product can be gated off, and a shift operation can be used to compute the product in these cases.

Figure 3:
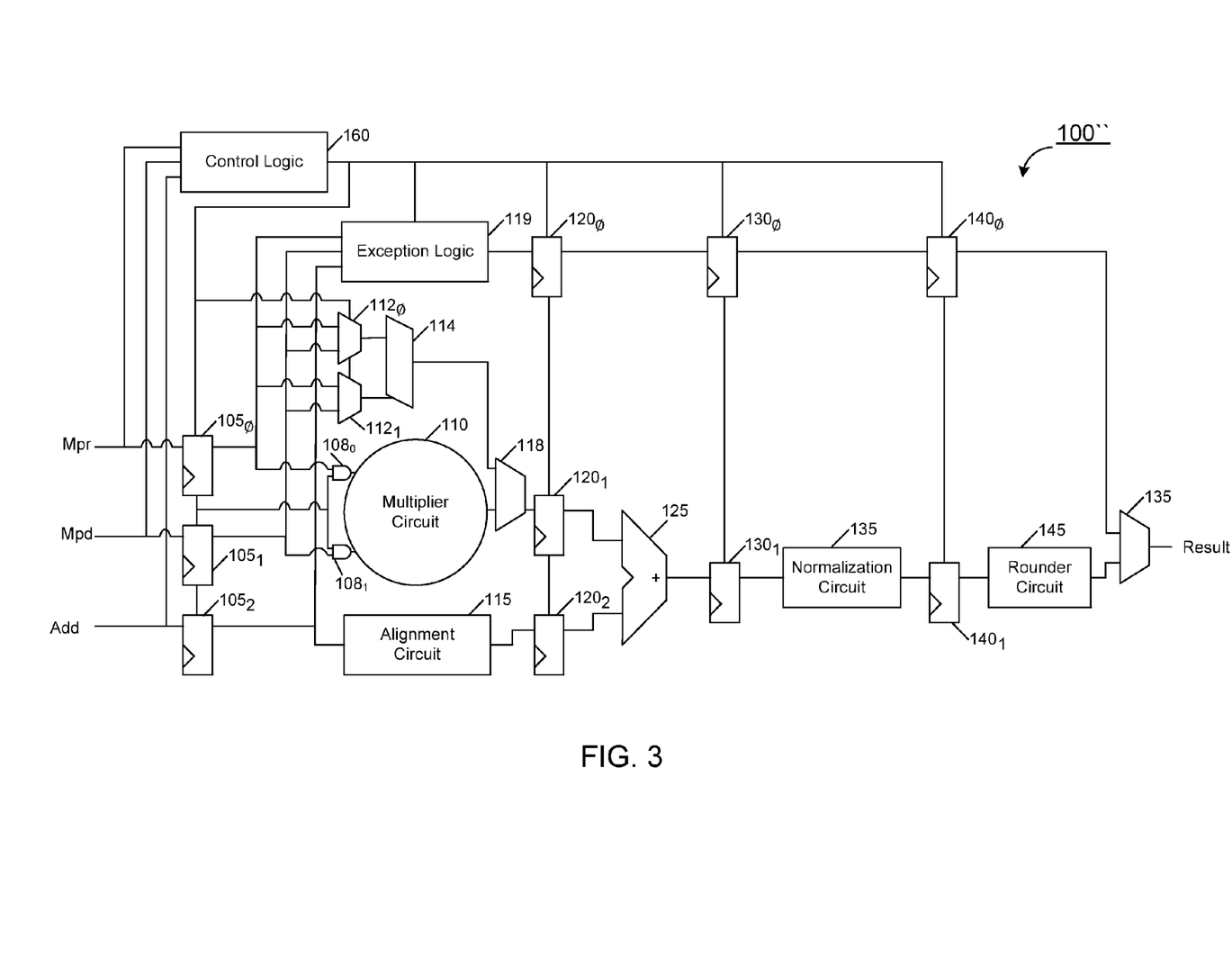
FIG. 3 is a schematic diagram of an FMA circuit in accordance with another embodiment of the present invention.

Referring now to FIG. 3, shown is a schematic diagram of an FMA circuit in accordance with another embodiment of the present invention. As seen in FIG. 3, FMA circuit 100" may be configured in substantially the same manner as FMA circuit 100 of FIG. 2. However in the embodiment of FIG. 3, additional logic circuitry, selection mechanisms and shift mechanisms are provided to enable handling additional data value cases to enable reduced power consumption. Specifically using the circuit of FIG. 3, the case where at least one of the multiplier and multiplicand is a power of two can be handled in a power reduced manner.

In addition to the circuitry described above as in FIG. 1, FMA circuit 100″ further includes a pair of selectors $112_0$ and $112_1$ each configured to receive the multiplicand and multiplier and responsive to control by control logic 160 to enable a selected one of these values to be provided to a shifter 114. Selector $112_1$ operates to select the appropriate inputs to the shifter. Accordingly, shifter 114 operates to shift the selected one of the multiplier or multiplicand N bits (left or right, depending on the inputs), where N is the direct power of two of the other of the multiplier and multiplicand. Thus this shifted value passes to a selector 118 which further receives the output of multiplier circuit 110. Accordingly when multiplier circuit 110 is clock gated for this case of a direct power of two multiplier/multiplicand, the output of shifter 114 thus passes through selector 118 to flop $120_1$.

Still referring to FIG. 3, note further the presence of AND gates $108_0$ and $108_1$. These AND gates may receive as inputs a corresponding one of the multiplier and multiplicand input values. In addition, these AND gates further receive the clock signal to flops $105_0$ and $105_1$. Thus when these values are not of a special case and thus are to be operated upon in multiplier circuit 110, the AND gates toggle and thus pass the values through to multiplier circuit 110. Instead in the situation where a special case is present, e.g., where one of the input data values is a direct power of two, these flops are clock gated and thus the AND gates do not toggle. In other respects, normal operation of FMA circuit 100″ occurs. In other respects, FMA circuit 100″ may be configured substantially the same as FMA circuit 100 of FIG. 2.

These above examples illustrate how data input driven fine grain clock gating can reduce average power within an FMA ALU, with low overhead cost and complexity. Embodiments may also reduce power consumption of performing non-FMA operations such as arithmetic operations, e.g., floating point addition and subtraction, logical operations such as AND/OR/shift/rotate, integer operations, comparison operations, and conversion operations, in the FMA circuit. To this end, the FMA ALU can operate at low power for operations other than FMA by clock gating off portions of the ALU based upon the instruction type. Typically the instruction type is known well ahead of the actual execution of an instruction in the ALU and hence controlling the clock gating with the instruction type avoids any timing paths to the clock gate controls.

Figure 4:
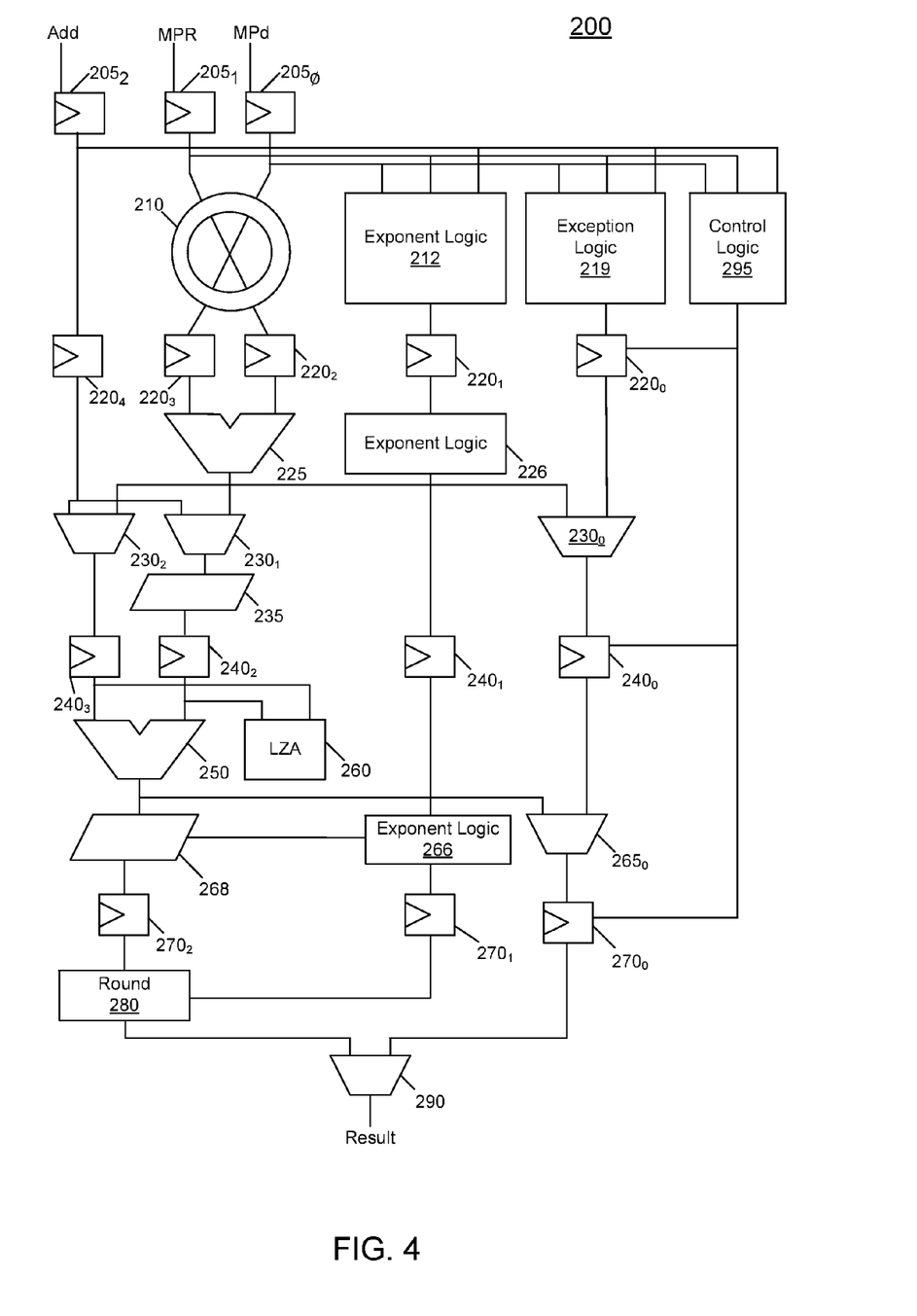
FIG. 4 is a schematic diagram of an FMA circuit in accordance with another embodiment of the present invention.

In one embodiment, to obtain the greatest power reduction, the flop stages within the ALU may be divided into as many sub-groups as possible. One possible division is illustrated in FIG. 4, for an example 4-cycle FMA ALU. Divisions include splitting the input flops into groups for each of the three sources (multiplier, multiplicand, and addend). Internal flop stages can be segmented into groups by functionality. For example, flops related to the floating point exponent logic may be split into separate groups as these flops need only be enabled for floating point operations. The finer the groups are the greater control one can have over the power of the operation.

Once the flop stages have been divided into groups, each group is then enabled or disabled as required for each instruction type. The fine granularity of the flop groups allows for significant portions of the ALU to stop toggling for simpler operations that are overlaid on top of the ALU. As such embodiments may reduce power consumption for these simpler operations, reducing the overall energy spent to execute a program.

As shown in FIG. 4, FMA circuit 200 generally includes similar structures as with the above FMA circuits. However, additional components are present to enable other operations to be performed within the datapath. In the circuit of FIG. 4, input data values are provided through a set of flops $205_0$-$205_2$. As seen, the multiplicand and multiplier are provided to a multiplier circuit 210. Note also that all three inputs are provided to an exponent logic 212 and an exception logic 219. In addition, all the circuits may be provided to a control logic 295 that performs power control in accordance with an embodiment of the present invention, based on the input data values and/or the type of instruction being executed within the FMA circuit. For a compare instruction such as a floating point compare instruction, the multiplicand input to flop $205_0$ can be clock gated to reduce the toggle rate within multiplier 210. Still further, outputs from flops $270_1$ and $270_2$ can similarly be clock gated, thus causing no input toggling in rounder circuit 280. As such, the final result of the comparison can be obtained via selector $265_0$ and through flop $270_0$.

Even greater amounts of clock gating can occur for a multiply instruction such as an integer multiply instruction. In this case, the addend input via flop $205_2$ can be clock gated, along with flops $220_0$, $220_1$ and $220_4$, and flops $240_1$-$240_3$, which in turn enable no toggling within adder circuit 250, leading zero anticipator 260, shifter 268, and exponent logic 266. In addition to clock gating flops $270_1$ and $270_2$ toggling in rounder circuit 280 is also avoided. Note a path from the exception logic may be provided to pass the result to the output.

Operations such as floating point addition and subtraction are input into the FMA circuit as A*1.0+B or A*1.0−B. Similar inputs occur for comparison and conversion operations. Typically the majority of these operations do not need to perform multiplication and are implemented by sending a constant on one of the inputs (e.g., A*1.0+B for addition).

As described above, embodiments may reduce power in these cases by clock gating off the flop inputs to the multiplier unit for cases such as A*1.0 and by clock gating off any internal and output flops for the multiplier unit, which can reduce dynamic power expended by the instruction, since the multiplier array is a large, power hungry structure, typically accounting for at least 50% of the area and a majority of the dynamic power in a FMA ALU, depending on the input data values.

The datapath further includes a set of flops $220_0$-$220_4$ that receives values from the prior stage. Flops $220_2$ and $220_3$ provide outputs to an adder 225, while flop $220_1$ provides an input to an additional stage of exponent logic 226. In turn, the output of flop $220_0$ is provided to a selector $230_0$, while the output of flop $220_4$ is provided to selectors $230_1$ and $230_2$. Both of these selectors further receive the sum output of adder 225, which is also provided to selector $230_0$. The output of selector $230_1$ is provided to a shifter 235, where this shifted output is provided to a flop $240_2$ of a set of flops $240_0$-$240_3$. The output of flops $240_2$ and $240_3$ are provided to another adder 250 and a leading zero anticipator 260, used during normalization. In turn, an output of flop $240_0$ is provided to a selector $265_0$ and an output of flop $240_1$ is provided to an additional stage of exponent logic 266.

The sum output of adder 250 is provided to another shifter 268 and to selector $265_0$, while the output of leading zero anticipator 260 is coupled to control exponent logic 266 and shifter 268. The output of shifter 268 couples through a flop $270_2$ and to a rounder circuit 280. The output of exponent logic 266 is coupled through a flop $270_1$, the output of which is used to control rounder circuit 280. A final selector 290 is coupled to receive the rounded output of rounder circuit 280 and the output of the exception path via selector $265_0$ and flop $270_0$. Although described at this high level in the embodiment of FIG. 4, understand additional circuitry may be present within the FMA datapath in other embodiments.

Figure 5:
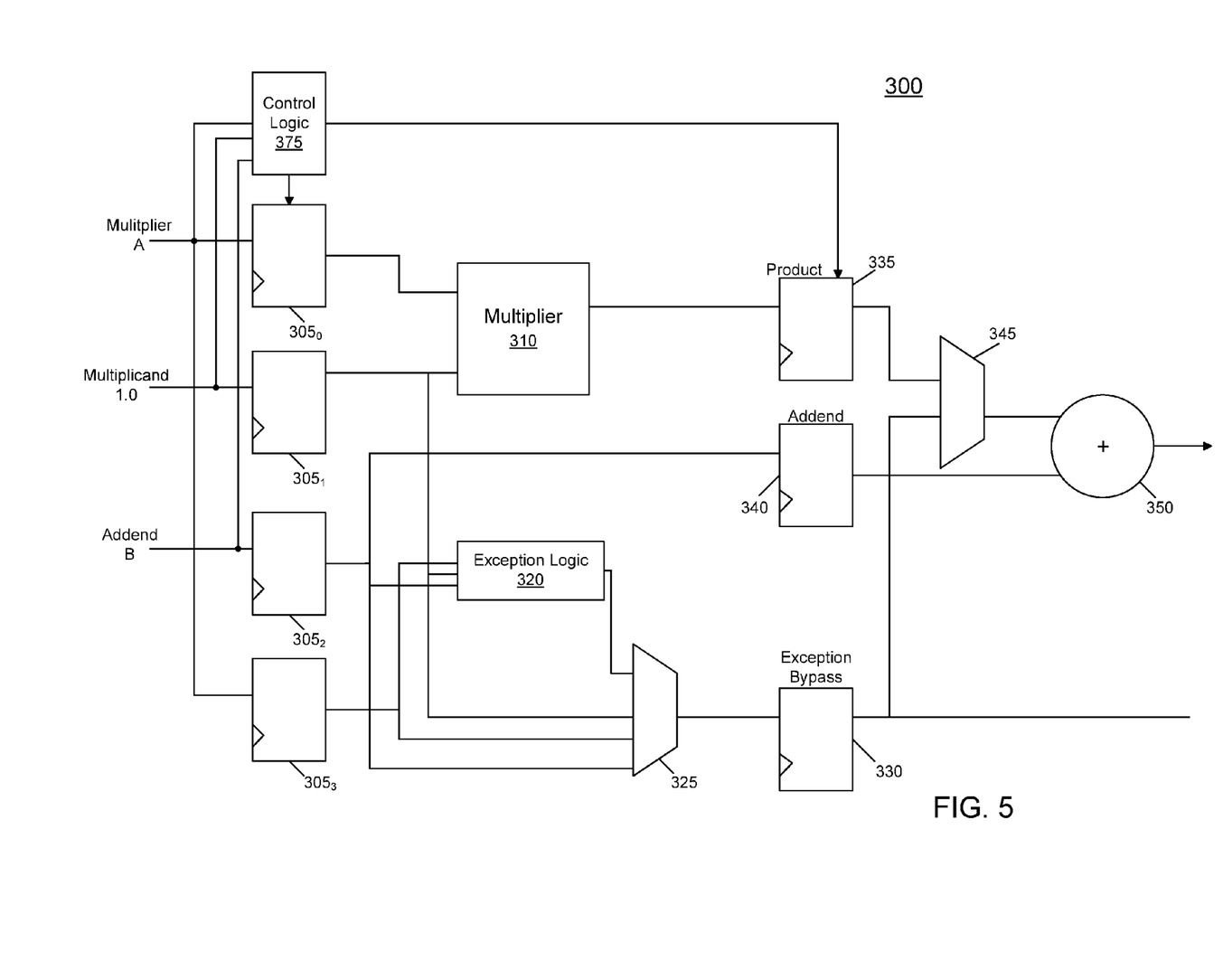
FIG. 5 is a schematic diagram of yet another FMA circuit in accordance with an embodiment of the present invention.

Referring now to FIG. 5, shown is a schematic diagram of yet another FMA circuit in accordance with an embodiment of the present invention. In this embodiment, the input data values are provided through a set of flops $305_0$-$305_2$. In addition, note that the multiplier input value is further coupled through an additional flop $305_3$. The multiplier and multiplicand input data values couple to a multiplier circuit 310 that in turn outputs a product, provided through a flop 335 to a selector 345. The clock gating and other control of this FMA circuit may be via control logic 375.

In cases where the multiplicand is of a predetermined value, e.g., 1.0, both flops $305_0$ and $305_1$ and multiplier unit 310 (and product flop 335) need not be clocked. Instead, the multiplier input data value provided through flop $305_3$ and via a selector 325 may instead be passed through an exception bypass flop 330 and into selector 345, which can be controlled to pass this direct multiplier input data value to adder 350. Adder 350 operates to add the multiplier and the addend provided to adder 350 via addend flop 340. Although shown at this high level in the embodiment of FIG. 5, understand the scope of the present invention is not limited in this regard.

Figure 6:
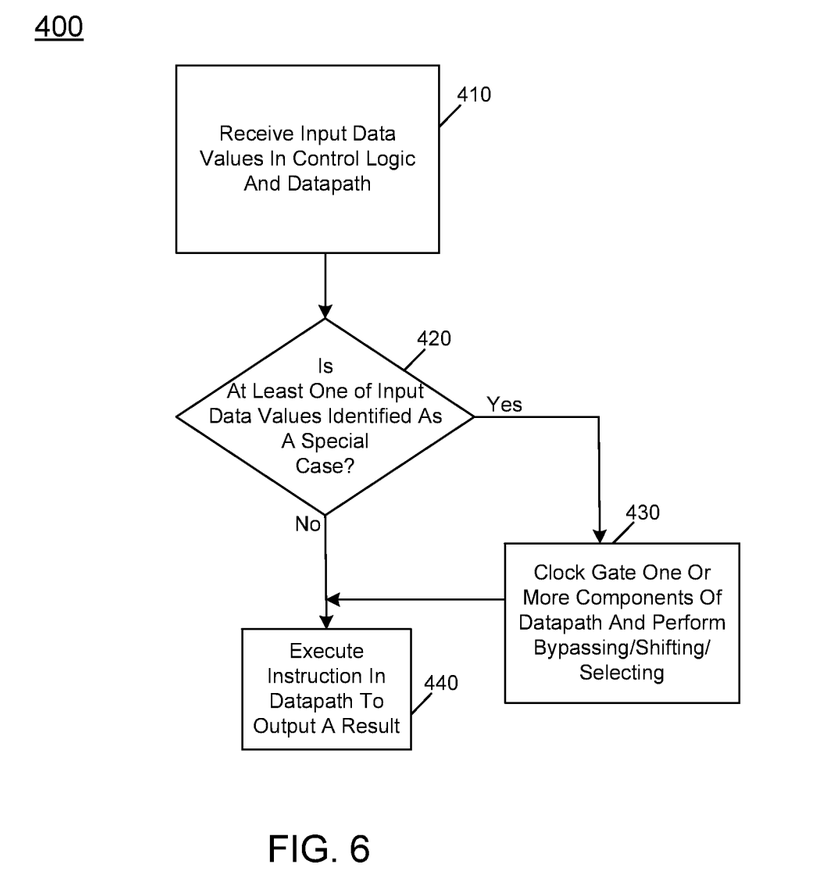
FIG. 6 is a flow diagram of a method in accordance with an embodiment of the present invention.

Referring now to FIG. 6, shown is a flow diagram of a method in accordance with an embodiment of the present invention. In one embodiment, method 400 can be performed by control logic of an FMA ALU, such as described above. In general, this control logic is configured to receive input data values to the FMA circuit, along with an indication of a type of instruction to be executed. This indication may be via input of the instruction itself or it can be an indication received from, e.g., a front end decoder unit of the processor that indicates the instruction type, e.g., an FMA instruction, a more simple operation such as an addition, multiplication, comparison or so forth.

As seen in FIG. 6, method 400 begins at block 410 by receiving these input data values in both the control logic and the datapath. As mentioned above, in some embodiments in addition to the input data values, the control logic can further receive an instruction type indication.

Next it can be determined at diamond 420 whether at least one of the input data values is identified as a special case value. Many of these special case values have been discussed above, such as a multiplier or multiplicand having a value of zero, one, or a power of two, an addend of zero, or an exceptional input. If such an input data value is present, control passes to block 430 where one or more components of the datapath can be clock gated. Still further, certain bypassing, shifting, selecting operations can also be performed. Such operations can occur before one or more of the other data input values are operated on in the datapath or during the course of execution in the cycles of the datapath. As seen, control passes to block 440 where the instruction can be executed and completed to thus output a result. If instead it is determined at diamond 420 that no special case is present, control passes directly to block 440. Note that a similar method can be performed by the control logic to perform clock gating and other operations responsive to particular instruction types, e.g., even when none of the input data values are of a special case. Although shown at this high level in the embodiment of FIG. 6, understand the scope of the present invention is not limited in this regard.

Figure 7:
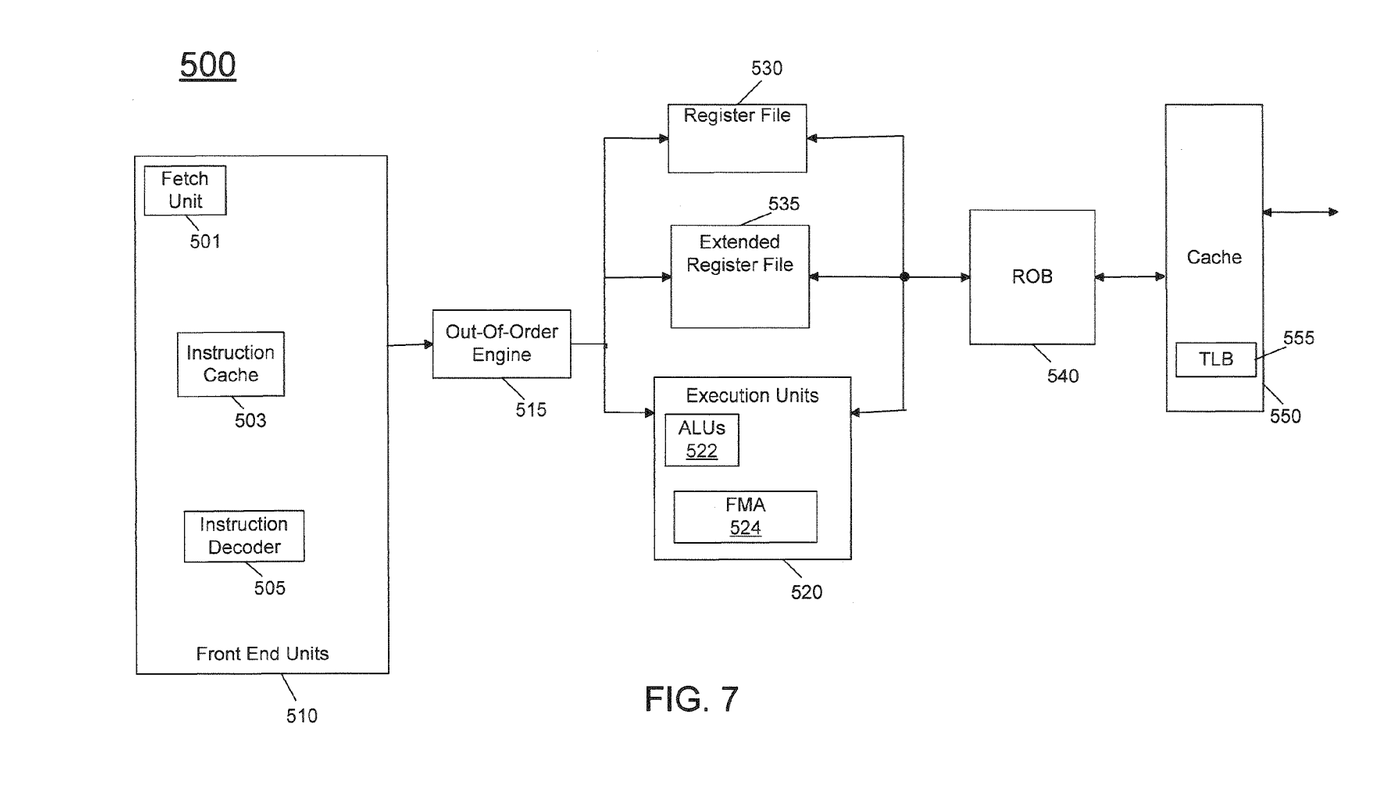
FIG. 7 is a block diagram of a processor core in accordance with one embodiment of the present invention.

Embodiments can be implemented in many different systems. For example, embodiments can be realized in a processor such as a multicore processor. Referring now to FIG. 7, shown is a block diagram of a processor core in accordance with one embodiment of the present invention. As shown in FIG. 7, processor core 500 may be a multi-stage pipelined out-of-order processor. Processor core 500 is shown with a relatively simplified view in FIG. 7 to illustrate various features used in connection with a FMA unit in accordance with an embodiment of the present invention.

As shown in FIG. 7, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives such as micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 335 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522. In addition, a FMA unit 524 may be present to generate a final result of a FMA or other instruction scheduled to the unit. In various embodiments, the unit may include control logic to clock gate portions of the unit as described above.

When operations are performed on data within the execution units, results may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 7, ROB 540 is coupled to cache 550 which, in one embodiment may be a low level cache (e.g., an L1 cache) and which may also include a translation lookside buffer (TLB) 555, although the scope of the present invention is not limited in this regard. Also, execution units 520 can be directly coupled to cache 550. From cache 550, data communication may occur with higher level caches, system memory and so forth. Note that while the implementation of the processor of FIG. 7 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 8:
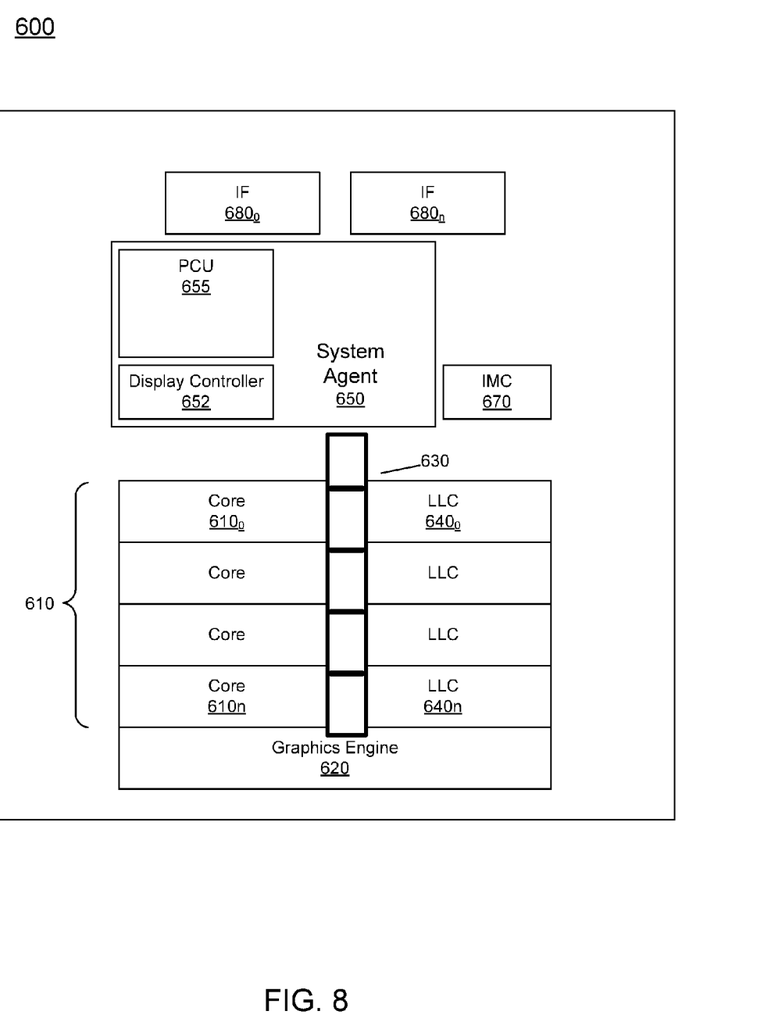
FIG. 8 is a block diagram of a multi-domain processor in accordance with an embodiment of the present invention of the present invention.

Referring now to FIG. 8, shown is a block diagram of a multi-domain processor in accordance with an embodiment of the present invention of the present invention. As shown in the embodiment of FIG. 8, processor 600 includes multiple domains. Specifically, a core domain 610 can include a plurality of cores $610_0$-$610_n$, a graphics domain 620 can include one or more graphics engines, and a system agent domain 650 may further be present. In various embodiments, system agent domain 650 may execute at a fixed frequency and may remain powered on at all times to handle power control events and power management such that domains 610 and 620 can be controlled to dynamically enter into and exit low power states. Note that while only shown with three domains, understand the scope of the present invention is not limited in this regard and additional domains can be present in other embodiments. For example, multiple core domains may be present each including at least one core.

In general, each core 610 may further include low level caches in addition to various execution units such as one or more FMA units in accordance with an embodiment of the present invention and additional processing elements. In turn, the various cores may be coupled to each other and to a shared cache memory formed of a plurality of units of a last level cache (LLC) $640_0$-$640_n$. In various embodiments, LLC 650 may be shared amongst the cores and the graphics engine, as well as various media processing circuitry. As seen, a ring interconnect 630 thus couples the cores together, and provides interconnection between the cores, graphics domain 620 and system agent circuitry 650.

In the embodiment of FIG. 8, system agent domain 650 may include display controller 652 which may provide control of and an interface to an associated display. As further seen, system agent domain 650 may include a power control unit 655 which can perform power management for a system in which the processor is located.

As further seen in FIG. 8, processor 600 can further include an integrated memory controller (IMC) 670 that can provide for an interface to a system memory, such as a dynamic random access memory (DRAM). Multiple interfaces $680_0$-$680_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 8, understand the scope of the present invention is not limited in this regard.

Figure 9:
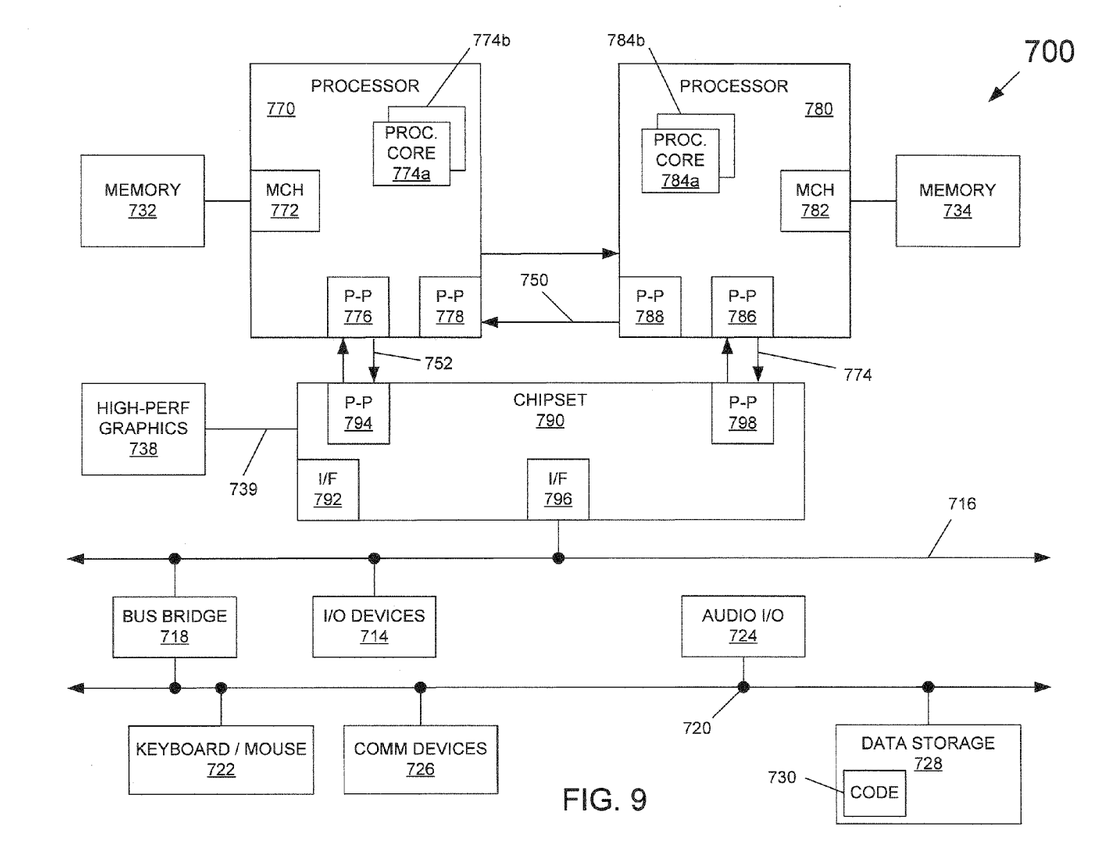
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 700 is a point-to-point interconnect system, and includes a first processor 770 and a second processor 780 coupled via a point-to-point interconnect 750. As shown in FIG. 9, each of processors 770 and 780 may be multicore processors, including first and second processor cores (i.e., processor cores 774a and 774b and processor cores 784a and 784b), although potentially many more cores may be present in the processors. Each of the cores can include a FMA unit that includes clock gate logic to perform clock gating of various portions of one or more datapaths of the FMA, based on one or more input data values and/or instruction type, as described herein.

Still referring to FIG. 9, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 9, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 9, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 9, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a core including a plurality of execution units to execute instructions, the plurality of execution units including a fused multiply-add (FMA) circuit to receive a plurality of input data values to perform an FMA instruction on the input data values, the FMA circuit including a multiplier unit and an adder unit coupled to an output of the multiplier unit, and a control logic to receive the plurality of input data values and to clock gate one or more components of the FMA circuit including at least one of the multiplier unit and the adder unit based on a value of at least one of the plurality of input data values.

2. The processor of claim 1, wherein the FMA circuit further comprises an exception logic to receive the plurality of input data values and to determine whether to raise an exception based on at least one of the plurality of input data values.

3. The processor of claim 2, wherein responsive to one of a multiplier of the plurality of input data values and a multiplicand of the plurality of input data values being zero, the control logic is to cause the exception logic to output an addend of the plurality of input data values, while the adder unit and the multiplier unit are prevented from toggling during performance of the FMA instruction.

4. The processor of claim 2, wherein the exception logic is to output a selected one of the plurality of input data values corresponding to an exceptional value, while the multiplier unit and the adder unit are prevented from toggling during performance of the FMA instruction.

5. The processor of claim 1, wherein the control logic is to cause the adder unit to be gated off when an addend of the plurality of input data values is zero.

6. The processor of claim 1, wherein the control logic is to cause the multiplier unit to be gated off when a multiplier of the plurality of input data values or a multiplicand of the plurality of input data values is $2^N$, where N is an integer.

7. The processor of claim 6, wherein the FMA circuit further comprises a shifter to select as an input one of the multiplier and the multiplicand and to shift the one by N to obtain a shifted value.

8. The processor of claim 7, wherein the adder unit is to sum an addend of the plurality of input data values and the shifted value to obtain a sum.

9. The processor of claim 1, wherein the control logic is to receive an instruction type to be performed in the FMA circuit and to clock gate at least one component of the FMA circuit based on the instruction type.

10. The processor of claim 1, wherein the FMA circuit further comprises:
a plurality of first selectors coupled to receive a product from the multiplier unit;
a shifter coupled to an output of a first one of the plurality of first selectors;
a first storage element coupled to a second one of the plurality of first selectors;
a second storage element coupled to a third one of the plurality of first selectors;
a third storage element coupled to an output of the shifter, wherein the product is output by the first one of the plurality of first selectors to the first storage element, and the second and third storage elements are clock gated during execution of a multiply instruction.

11. The processor of claim 1, wherein the FMA circuit comprises:
a first set of storage elements including a first storage element and a fourth storage element to receive a multiplier of the plurality of input data values, a second storage element to receive a multiplicand of the plurality of input data values, and a third storage element to receive an addend of the plurality of input data values, wherein the first and second storage elements are clock gated when the multiplicand equals one.

12. The processor of claim 11, wherein the control logic is to prevent sequential clocks of the multiplier unit from toggling when the multiplicand equals one, the multiplier of the plurality of input data values to be routed from the fourth storage element to the adder unit for addition with the addend of the plurality of input data values.

13. A method comprising:
receiving a plurality of input data values associated with an operation to be executed in an arithmetic logic unit (ALU) of a processor, the ALU including a fused multiply-add (FMA) circuit having multiplier circuit and an adder circuit to perform a FMA instruction;
determining, in control logic of the processor, whether at least one of the plurality of input data values is of a first type; and
responsive to determining that at least one of the plurality of input data values is of the first type, disabling at least one of the multiplier circuit and the adder circuit of the FMA circuit, and executing the operation in the ALU to generate a result.

14. The method of claim 13, wherein disabling the at least one of the multiplier circuit and the adder circuit comprises clock gating a storage element coupled to an input of the at least one of the multiplier circuit and the adder circuit.

15. The method of claim 13, wherein when at least one of a multiplicand input data value and a multiplier input data value equals a first value, disabling the multiplier circuit and the adder circuit, and providing an addend input data value to an output of the ALU to generate the result.

16. The method of claim 13, wherein when one of a multiplicand input data value and a multiplier input data value equals a second value, disabling the multiplier circuit and shifting a value of the other of the multiplicand input value and the multiplier input data value by a selected number of bits, the selected number of bits based on the one of the multiplier input data value and the multiplicand input data value, and adding the shifted value with an addend input data value to generate the result.

17. The method of claim 13, wherein when one of a multiplicand input data value and a multiplier input data value equals a third value, disabling the multiplier circuit and adding the other of the multiplicand input data value and the multiplier input data value with an addend input data value to generate the result.

18. The method of claim 13, wherein when at least one of the plurality of input data values is an exception case, disabling the multiplier circuit and the adder circuit, and generating the result in an exception datapath of the ALU.

19. A system comprising:
a multicore processor including a plurality of cores, at least one of the cores including a fused multiply add (FMA) circuit having a main datapath and an exception datapath, and a control logic coupled to the FMA circuit to disable at least a portion of the main datapath responsive to input of an input data value of a first type, the FMA circuit to generate a result of an instruction associated with a plurality of input data values including the input data value of the first type, wherein the main datapath includes a first stage of storage elements each to receive one of the plurality of input data values, a multiplier circuit to multiply a first input data value and a second input data value, a second stage of storage elements, at least one of which is coupled to an output of the multiplier circuit, and an adder circuit to add a third input data value with a selected data value, wherein the control logic is to disable at least one of the multiplier circuit and the adder circuit responsive to the input of the input data value of the first type; and
a dynamic random access memory (DRAM) coupled to the multicore processor.

20. The system of claim 19, wherein the control logic is further to disable at least the main datapath responsive to a type of the instruction.

21. The system of claim 19, wherein the control logic is to disable first and second ones of the first stage of storage elements when at least one of the first and second input data values equals zero.

22. The system of claim 19, wherein the control logic is to cause the third input data value to be output from the exception datapath as the result when at least one of the first and second input data values equals zero.

23. The system of claim 19, wherein the first stage of storage elements comprises a first storage element and a fourth storage element to receive the first input data value, a second storage element to receive the second input data value, and a third storage element to receive the third input data value, wherein the first and second storage elements are to be clock gated when the second input data value equals one.

* * * * *